United States Patent [19]

Byford et al.

[11] Patent Number: 5,585,760
[45] Date of Patent: Dec. 17, 1996

[54] REGULATED POWER SUPPLY WHEREIN A BATTERY SOURCE IS SUPPLEMENTED BY AUXILIARY POWER PROVIDED BY DATA SIGNALS

[75] Inventors: Peter Byford, Hampshire; Roger Allcorn, Gwent, both of United Kingdom

[73] Assignee: Thames Water Utilities Limited, Reading, United Kingdom

[21] Appl. No.: 231,708

[22] Filed: Apr. 22, 1994

[30] Foreign Application Priority Data

Apr. 22, 1993 [GB] United Kingdom .................... 9308379

[51] Int. Cl.⁶ ...................................... G05F 1/10
[52] U.S. Cl. ............................. 327/545; 327/64
[58] Field of Search ................. 307/66, 64, 65; 327/545, 546, 547; 235/492

[56] References Cited

U.S. PATENT DOCUMENTS

| | | | |
|---|---|---|---|
| 3,502,905 | 3/1970 | Bicking | 307/235 |
| 4,209,710 | 6/1980 | Quarton | 307/66 |
| 4,492,876 | 1/1985 | Colbert et al. | 307/66 |
| 4,532,511 | 7/1985 | Lemelson | 235/492 |
| 4,617,473 | 10/1986 | Bingham | 307/66 |
| 4,729,083 | 3/1988 | Kyriakos | 307/66 |
| 4,788,450 | 11/1988 | Wagner | 307/66 |
| 5,103,157 | 4/1992 | Wright | 307/66 |
| 5,272,393 | 12/1993 | Horiguchi et al. | 307/296.6 |
| 5,326,965 | 7/1994 | Inoue | 235/492 |
| 5,349,173 | 9/1994 | Scheckel et al. | 235/492 |
| 5,418,353 | 5/1995 | Katayama et al. | 235/492 |
| 5,430,365 | 7/1995 | Taylor et al. | 323/273 |
| 5,449,894 | 9/1995 | Bruhnke et al. | 235/492 |

Primary Examiner—Timothy P. Callahan
Assistant Examiner—Jeffrey Zweizig
Attorney, Agent, or Firm—Lowe, Price, LeBlanc & Becker

[57] ABSTRACT

A regulated power supply can be derived from a battery supply input and a regulator, but in order to conserve battery power, alternative power supplies can be provided each with a switch responsive to the regulator to connect that alternative power supply to the output when it rises to the level of the battery supply.

3 Claims, 1 Drawing Sheet

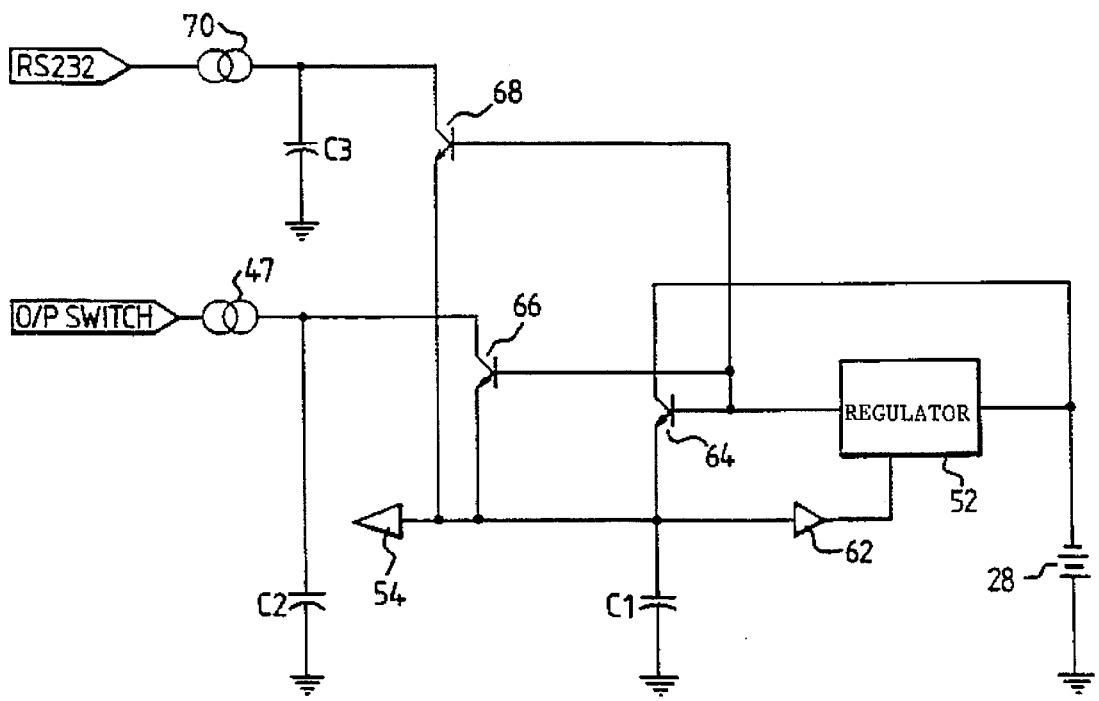

REGULATED POWER SUPPLY WHEREIN A BATTERY SOURCE IS SUPPLEMENTED BY AUXILIARY POWER PROVIDED BY DATA SIGNALS

TECHNICAL FIELD

The present invention relates to utility meters and more particularly to a meter power supply that may be supplemented from an auxiliary source within the utility meter circuit.

BACKGROUND ART

Conventional meters which measure the consumption of a utility, such as water flow, contain apparatus responsive to the passage of that utility to operate a counter which provides a visual display. Such meters provide a problem in that the meter has to be accessed to read the visual display in order to bill the customer. It has therefore been suggested that the meter should provide a series of pulses in response to the passage of the utility and those pulses should be transmitted to a central location for counting and creating a bill for the customer. The pulse generation and transmission consumes power and it is an object of the present invention to reduce the amount of power consumed.

SUMMARY OF INVENTION

The power for the meter is supplied from a regulated power supply and the invention improves such a power supply.

According to one aspect of the invention there is provided a power supply comprising an output, a battery power input, at least one alternative power input, a regulator connected between the battery power input and the output for controlling the voltage at the output to the level of the battery power input and a switch for each power input connected between that input and the output and under the control of the regulator for connecting that power input to the output when its voltage rises above that of the battery power input.

BRIEF DESCRIPTION OF DRAWINGS

An example of the invention will now be described with reference to the accompanying drawing in which: The sole Figure is a power control module.

DESCRIPTION OF PREFERRED EMBODIMENTS

In the sole Figure, a lithium battery 28 is connected to a low-drop, low-loss regulator 52 connected through a feedback line containing a diode 62 to a regulated output terminal 54. If any voltage is applied to the regulated output terminal 54 which is above the voltage supplied by the lithium battery, current will flow through the diode 62 back to the regulator 52 so that the voltage at the output 54 will be regulated to the voltage of the lithium battery.

The circuit of the sole FIG. 5 is supplied with a plurality (in this case three) of alternative power inputs. Each power supply is provided with its own transistor switch 64, 66, 68 whose collector is connected to the power supply, whose emitter is connected in common to the regulated out terminal 54 and whose base is connected in common to the output of the regulator 52. One of the alternative power supplies is the lithium battery 28, another is a current source 47 connected to an output source module and stored in a low-loss capacitor C2 and another is the power supply available from an RS232 interface having a current source 70 whose power is stored in low-loss capacitor C3.

When no voltage is available from 47 or 70, the connection between the lithium battery 28 and the collector of transistor 64 causes that transistor to conduct, connecting the voltage of the lithium battery 28 to the regulated output terminal 54. If either of the voltages at 47 or 70 rise above that of the lithium battery 28, it will cause the corresponding transistor 66 or 68 to connect that voltage to the regulated output terminal, any excess voltage being bled off through the feedback diode 62 to the regulator 52. This arrangement conserves the energy stored in the lithium battery 28 and uses the alternative power sources (provided by data signals) in preference to that of the lithium battery when they are available.

We claim:

1. A regulated power supply wherein a battery source is supplemented by auxiliary power provided by data signals, comprising:

a battery power input for providing a battery supply voltage;

at least one data signal line for providing a data signal supply voltage;

an output terminal for providing a regulated power supply voltage;

a regulator coupled between said battery power input and said output terminal for providing, at a common terminal, a control signal for regulating the voltage at the output terminal to the level of the battery power input, a first transistor connected between said battery power input and said output terminal, said first transistor having a control electrode connected to said common terminal;

a second transistor connected between said at least one data signal line and said output terminal, said second transistor having a control electrode connected to said common terminal; wherein when said data signal supply voltage is less than said battery supply voltage, said first transistor is caused to conduct for connecting and regulating said battery supply voltage to said output terminal, and when said data supply voltage rises above said battery supply voltage, said second transistor is caused to conduct for connecting and regulating said data supply voltage to said output terminal.

2. The regulated power supply as claimed in claim 1, further comprising:

a second data signal line for providing a second data signal supply voltage;

a third transistor connected between said second data signal line and said output terminal, said third transistor having a control electrode connected to said common terminal; wherein when said second data signal supply voltage rises above said battery supply voltage and said at least one data signal supply voltage, said third transistor is caused to conduct for connecting and regulating said second data signal supply voltage to said output terminal.

3. The regulated power supply as claimed in claim 1 wherein the output is connected to the regulator through a diode for bleeding any excess voltage at the output back to the regulator.

* * * * *